J. W. PENCE.
Land Roller.

No. 107,287.  Patented Sept. 13, 1870.

UNITED STATES PATENT OFFICE.

JOHN W. PENCE, OF CLAYTON, OHIO.

IMPROVEMENT IN EARTH-PULVERIZERS.

Specification forming part of Letters Patent No. 107,287, dated September 13, 1870.

*To all whom it may concern:*

Be it known that I, Dr. JOHN W. PENCE, of Clayton, in the county of Montgomery and State of Ohio, have invented a new and useful Improvement in Earth-Pulverizers; and I do hereby declare that the following is a full, clear, and exact description thereof, which will enable others skilled in the art to make and use the same, reference being had to the accompanying drawings, forming a part of this specification.

This invention has for its object to furnish to the farming community an improved machine for pulverizing the soil.

The improvement consists in so arranging the cutter-shafts that they shall be adjustable vertically in the frame of the machine.

Figure 1:
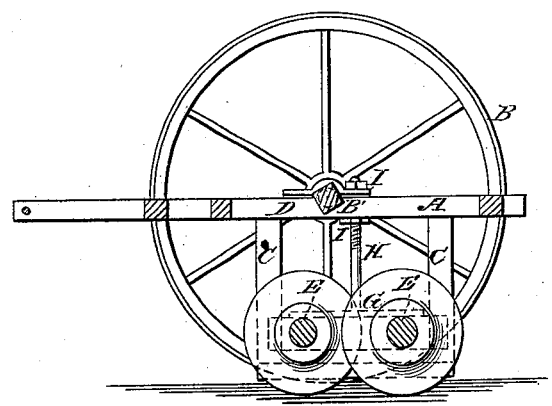
Figure 2:
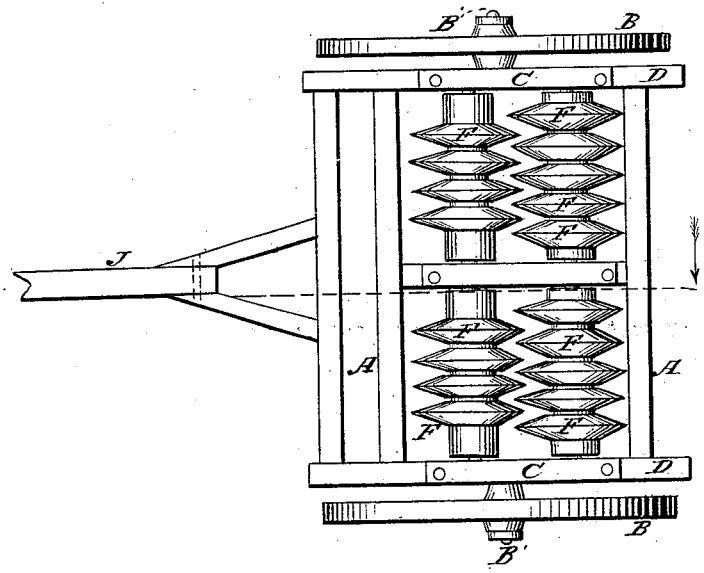

In the accompanying drawings, Figure 1 represents a vertical section of Fig. 2 on the line $x$ $x$, looking in the direction of the arrow. Fig. 2 is a bottom plan view of the machine, showing the form and position of the cutters.

Similar letters of reference indicate corresponding parts.

A is the frame, which is mounted on the two wheels B B by means of a central axle, C, which axle may either revolve with the wheels or the wheels may revolve thereon in the usual manner. In this example of my invention the axle revolves on the frame, and the wheels are fast thereto.

C C represent frames which are attached to the lower side pieces, D D, of the frame A. These frames C C support the shafts E E, on which the cutters revolve.

F represents the cutters, which are circular disks beveled on each side to an edge, as seen in the drawings. These cutters are arranged on the two parallel shafts E, so that they lap by or lock into each other, as seen in Fig. 2, thus rendering them self-clearing when they are in motion.

G represents the boxes in which the cutter-shafts revolve. These boxes are supported by the frame C C, and are made adjustable by means of the screw-rods H, which pass up through the frame A.

I I are screw-nuts on the adjusting-rods H, above and below the frame, which keep the screws and the boxes stationary when once the cutters have been adjusted to cut the required depth.

J is the tongue, to which the team is attached.

It will be observed that the arrangement for adjustment of the cutters adapts the machine to operate in the desired manner on different soils, or in different conditions of the same soil, and likewise enables the cutters to be raised, so that the machine may be driven over ordinary roads without injury or impediment.

Having thus described my invention, what I claim as new, and desire to secure by Letters Patent, is—

The arrangement of the boxes G, screw-rods H, and nuts I with the shafts E, cutters F, and frame A C, substantially as shown and described.

DR. JNO. W. PENCE.

Witnesses:
L. HECH,
HIRAM KINZEY.